United States Patent [19]

Powers et al.

[11] Patent Number: 4,987,643
[45] Date of Patent: Jan. 29, 1991

[54] SLIDE PLATE PATTY FORMING APPARATUS

[75] Inventors: Richard G. Powers, Overland Park, Kans.; Eugene J. London, Allentown, Pa.; Lewis F. Alley, Kansas City, Mo.; James E. Anderson, Prairie Villiage; Joseph S. Zeets, Olathe, both of Kans.

[73] Assignee: Marlen Research Corporation, Overland Park, Kans.

[21] Appl. No.: 392,075

[22] Filed: Aug. 10, 1989

[51] Int. Cl.$^5$ .............................................. A22C 7/00
[52] U.S. Cl. ..................................... 425/139; 426/513
[58] Field of Search ............................. 17/32; 426/513

[56] References Cited

U.S. PATENT DOCUMENTS

| | | |
|---|---|---|
| 28,106 | 8/1874 | Lee . |
| 30,096 | 9/1879 | Richards . |
| 470,692 | 3/1892 | Merrell . |
| 994,714 | 6/1911 | Boyle . |
| 1,473,590 | 11/1923 | Wallace . |
| 1,530,189 | 3/1925 | Miller . |
| 1,648,834 | 11/1927 | Wallace . |
| 1,651,040 | 11/1927 | Reilly . |
| 1,749,178 | 3/1930 | Berg . |
| 1,758,942 | 5/1930 | Gottlieb et al. . |
| 1,911,017 | 5/1933 | Garfunkel . |
| 1,942,582 | 1/1934 | Vogt . |
| 2,052,734 | 9/1936 | Walter . |
| 2,475,463 | 7/1949 | Santo . |
| 2,528,234 | 10/1950 | Lilien . |
| 2,651,808 | 9/1953 | Burnett et al. . |
| 2,666,229 | 1/1954 | Vogt . |
| 2,670,114 | 2/1954 | Dobbins, III . |
| 2,702,405 | 2/1955 | Garfunkel . |
| 2,708,287 | 5/1955 | Long et al. . |
| 2,729,947 | 1/1956 | Cheney . |
| 2,770,202 | 11/1956 | Garfunkel . |
| 2,799,044 | 7/1957 | Mahan . |
| 2,817,200 | 12/1957 | Garfunkel . |
| 2,989,932 | 6/1961 | Egee et al. . |
| 3,096,540 | 7/1963 | Miller et al. . |
| 3,122,869 | 3/1964 | Miller et al. . |
| 3,137,029 | 6/1964 | De Zolt . |
| 3,205,837 | 7/1965 | Fay . |
| 3,245,106 | 4/1966 | Alderdice . |
| 3,296,655 | 1/1967 | Vidjak et al. . |
| 3,347,176 | 10/1967 | Hall . |
| 3,382,528 | 5/1968 | Noble . |
| 3,427,649 | 2/1969 | Fay . |
| 3,433,647 | 3/1969 | Johnston . |
| 3,452,389 | 7/1969 | Felstehausen . |
| 3,462,178 | 8/1969 | Felstehausen . |
| 3,504,639 | 4/1970 | Lilien . |
| 3,633,245 | 1/1972 | Partos . |
| 3,851,355 | 12/1974 | Hughes . |
| 3,939,530 | 2/1976 | Holly .................... 17/32 |
| 3,982,035 | 9/1976 | Orlowski . |
| 4,193,167 | 3/1980 | Orlowski . |
| 4,212,609 | 7/1980 | Fay . |
| 4,233,710 | 11/1980 | Wagner . |
| 4,276,318 | 6/1981 | Orlwaski . |
| 4,356,595 | 11/1982 | Sandberg et al. ...................... 17/32 |
| 4,608,731 | 9/1986 | Holly .................... 17/32 |
| 4,872,241 | 10/1989 | Linder .................... 17/32 |

Primary Examiner—Willis Littli
Attorney, Agent, or Firm—Hovey, Williams, Timmons & Collins

[57] ABSTRACT

An improved, slide plate-type patty forming apparatus (20) is provided which preferably includes a reciprocating slide plate (60) with a removable, multiple piston and cavity head (78) adapted to move between a retracted meat-filling position wherein respective patty forming cavities (90) are filled with meat to an extended patty-discharging position wherein formed meat patties (264) are ejected. Each of the patty forming pistons (96) is equipped with a porous bottom plate (104) formed of sintered metal or ceramic, an appropriate compressed air passageways (120, 122, 106) are provided for delivery of air through the bottom plate (104) for cleanly ejecting the formed patty (264). Adjusting mechanism (26) for altering the thickness of formed patties (264) includes a plurality of adjusting units (166) each equipped with a vertically shiftable, piston-engaging foot (176); movement of the feet (176) in unison is effected by means of handwheel (164) and connecting gear train (162, 200, 194, 192, 174). Individual variance of respective patty forming stations can also be accomplished by gear disengagement and manual adjustment.

18 Claims, 8 Drawing Sheets

SLIDE PLATE PATTY FORMING APPARATUS

BACKGROUND OF THE INVENTION

1. Field of the Invention

The present invention is broadly concerned with an improved, high-capacity patty forming apparatus adapted for use in the commercial production of meat patties formed of, e.g., chicken, beef or pork. More particularly, it is concerned with such an apparatus which in preferred forms includes a reciprocating slide plate equipped with a removeable, multiple piston and cavity head adapted to receive and form patties, and with piston-adjusting mechanism permitting both individual and ganged adjustment of patty thickness without the necessity of piston removal; moreover, the preferred apparatus includes pistons having porous meat-engaging faces together with structure for delivering bursts of pressurized air through the piston faces in order to positively disengage the formed patties from the respective cavities.

2. Description of the Prior Art

Large food processors supplying meat patties to restaurants and fast food chains make use of industrial sized patty forming equipment. Obviously, such equipment is essential in order to economically produce the huge quantities of meat patties needed to meet customer demand.

One type of known patty forming device is described in U.S. Pat. No. Re. 30,096. This machine, known as a "Formax" patty former, is characterized by an apertured slide plate which is shiftable between a retracted position wherein meat is received within the patty forming apertures thereof, and an extended position wherein the formed patties are ejected from the slide plate. For this purpose, the machine is equipped with a stationary ejector device located at the patty discharge position and provided with multiple, up and down reciprocal patty knock-outs.

While slide plate devices of this type have achieved a measure of use in the industry, a number of problems remain. First, the output capacity of these machines is normally limited to a maximum of no more than 4,000 pounds of meat per hour, or 80 cycles of the patty forming mechanism per minute, whichever is achieved first. This capacity is significantly lower than the requirements of many present-day patty forming operations.

In addition, slide plate formers of the type disclosed in the referenced patent require that the slide plate be changed in order to alter the thickness or size of the patties being formed. Such a changeover operation entails considerable effort and down time, and is therefore costly.

Finally, many users of Formax machines have experienced considerable problems and expense by virtue of the need for rather frequent parts replacement. This problem is believed to be partially due to the use of fixed position patty knock-outs as described above, which can become misaligned with the slide plate apertures and, during high speed operations, induce extreme machine vibrations.

Another type of prior patty forming apparatus is described in U.S. Pat. No. 4,193,167. This type of machine employs a rotatable turret plate equipped with a series of spaced patty forming cavities, each of the latter including a shiftable piston therein. Up and down movement of the pistons is controlled via an overhead cam arrangement, so that, as the turret rotates, the meat is first delivered to individual cavities and thereafter deposited in patty form on a belt or the like.

Turret machines suffer from many of the problems of prior slide plate devices, particularly low output (typically, such machines can produce patties only one at a time as the turret rotates). Furthermore, such machines are particularly difficult to adjust so that all patties produced by the respective cavity/piston assemblies are of uniform size and weight. That is to say, with such turret machines, it is virtually impossible to individually adjust the respective pistons so as to give precisely even patty weights from all cavities.

In order to insure patty discharge from the turret cavities, use is made of a continuous moving cut-off band located adjacent the patty discharge position and designed to strip the patties from the individual pistons. Expedients such as these have proved to be troublesome in that meat tends to "hang up" on the stripper and/or piston. This leads to deformed patties, improper patty weights, and generally unsanitary conditions.

SUMMARY OF THE INVENTION

The present invention overcomes the problems outlined above and provides a greatly improved, high capacity patty forming device characterized by ready adjustment to insure even patty weights, and a unique system for positive ejection of formed patties making use of porous, air permeable piston faces.

The preferred forming apparatus of the present invention includes a patty forming plate assembly including structure defining a plurality forming cavities with a slidable piston within each cavity which is movable between a retracted position allowing flow of patty forming material into the associated cavity, and an extended discharge position for discharge or ejection of the formed patties. The material-engaging faces of the pistons are formed of a porous material such as sintered metal, porous synthetic resin (e.g., polyethylene) or porour ceramic.

The apparatus further includes structure for supporting the plate assembly for shifting movement thereof between a position for receiving meat or other patty forming material into the cavities, and a spaced discharge position wherein the formed patties are discharged. Preferably, the slide plate assembly comprises an apertured, generally flat, fore and aft shiftable forming plate (moved via a pair of metal hydraulic piston and cylinder assemblies) together with a multiple cavity head secured to the plate for movement therewith.

In order to supply the plate assembly with patty forming material, means including an appropriately sized chamber is situated beneath the plate assembly; the chamber is adapted for coupling with a source of patty forming material under pressure, such as a twin piston food pump of the type commercialized by Marlen Research Corporation of Overland Park, Kans. In addition, the chamber communicates with an accumulator conduit including an accumulator piston therein, to even flow through the chamber and to the patty forming cavities.

Selectively actuatable pneumatic apparatus is also coupled with the cavity pistons in order to accomplish two ends, namely downward shifting of the pistons to their discharge positions, and, near the end of this stroke, delivery of a burst of pressurized air or other gas through the porous piston face in order to forcibly and cleanly separate the formed patties from the piston.

Adjustment of the respective pistons within their associated cavities is effected by means of an adjustment mechanism situated above the piston head adjacent the material-receiving position of the slide plate. The adjusting mechanism serves to limit the movement of the pistons within the associated cavities, and is equipped with structure for selectively altering the stroke length of the pistons to thereby vary the thicknesses of the patties. Very importantly, this movement-limiting means is designed for thickness adjustment of all of the pistons in unison, or alternately for individual thickness adjustment of each of the pistons with respect to the other pistons. In this fashion, the patty former can be precisely adjusted to give uniform weights and thicknesses from all cavities; moreover, if desired, certain cavities can be adjusted to produce relatively thin patties, whereas other pistons within the head may be adjusted for relatively thicker patties. In addition, such adjustment may be effected without removal of the pistons from their associated cavities, or replacement of the reciprocal slide plate. Furthermore, adjustment in unison of the pistons can safely be made without stopping the operation of the patty former.

The preferred patty forming apparatus is also equipped with a unique sealing arrangement provided between the material-conveying chamber and the slide plate assembly. Specifically, the chamber is provided with an apertured, generally horizontally extending, top plate having a sealing groove extending circumferentially about the top plate aperture. A deflectable, intermediate shearing plate formed of resilent synthetic resin material such as nylon is positioned in overlying relationship to the top plate, and likewise has an aperture in general alignment with the top plate aperture. However, the shearing plate aperture is smaller than that of the top plate, such that the shearing plate presents an inwardly extending lip region extending about the periphery of the top plate aperture. Finally, the slide plate assembly is positioned atop the shearing plate and is shiftable relative to both the shearing plate and the top plate.

In operation, material under positive pressure fed to the material-conveying chamber beneath the slide plate assembly engages the aforementioned lip region of the shearing plate and deflects the latter into positive sealing engagement with the slide plate assembly. At the same time, a fluid pressure actuatable sealing member is situated within the top plate groove and can be selectively operated to extend upwardly into sealing engagement with the shearing plate.

DESCRIPTION OF THE PREFERRED EMBODIMENT

Figure 1:
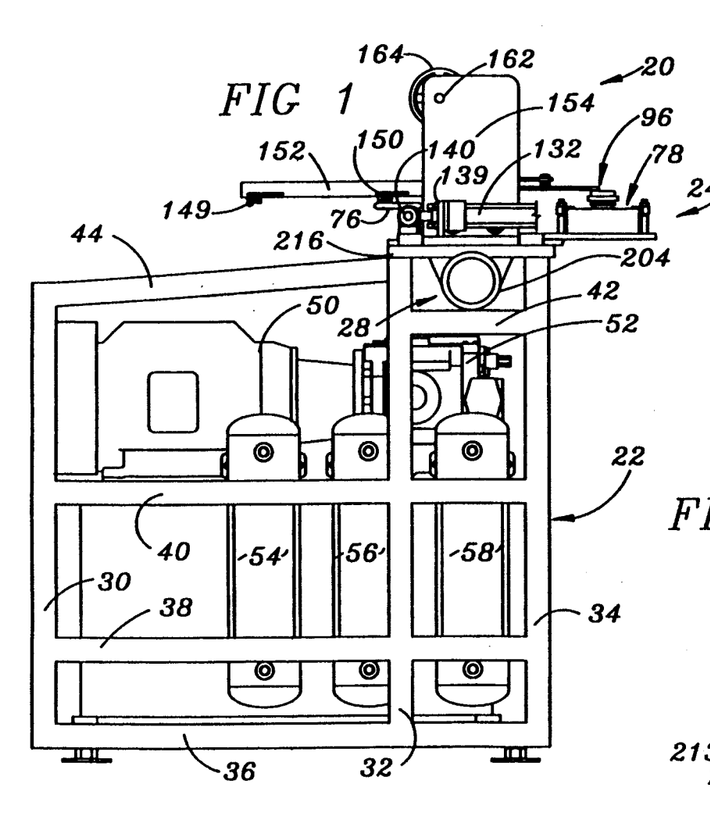
FIG. 1 is a side elevational view of the preferred patty forming apparatus of the invention.

Turning now to the drawings, and particularly FIG. 1, patty forming apparatus 20 broadly includes a lower frame 22, slide plate assembly 24, adjustment mechanism 26, and a material feeding assembly 28.

Figure 2:
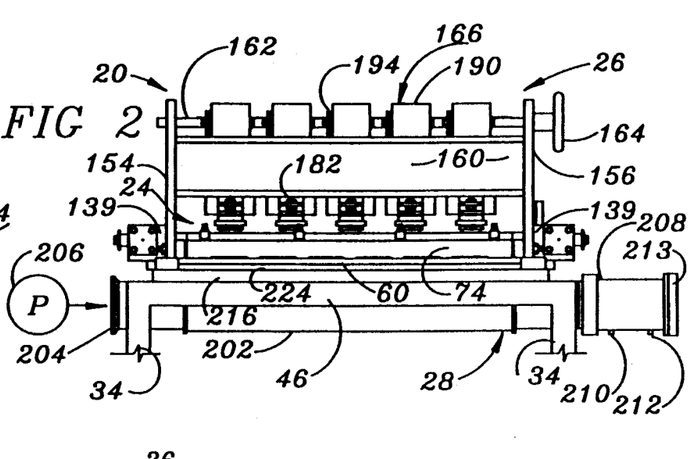
FIG. 2 is a fragmentary end view with parts broken away for clarity and depicting the discharge end of the apparatus.
Figure 3:
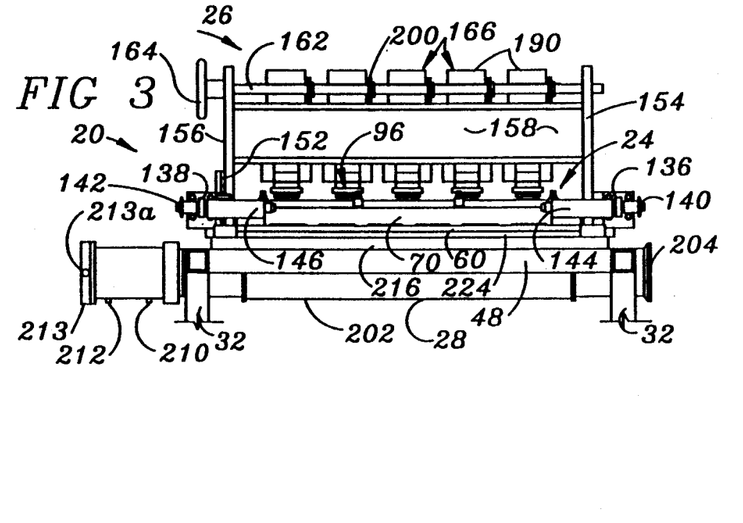
FIG. 3 is a view similar to that of FIG. 2, but depicting the opposite end of the apparatus.

In more detail, the frame assembly 22 includes spaced pairs of uprights 30-34 together with spaced pairs of crosspieces 36-44 and upper cross beams 46-48 (see FIGS. 2-3) which are interconnected with the uprights to form a free-standing three-dimensional frame. As illustrated, the apparatus components 24, 26 and 28 are supported on the frame structure adjacent the upper end thereof. The lower frame beneath the patty forming components supports an electric motor 50 operatively connected with hydraulic pump 52; and three compressed air tanks 54-58.

Figure 8:
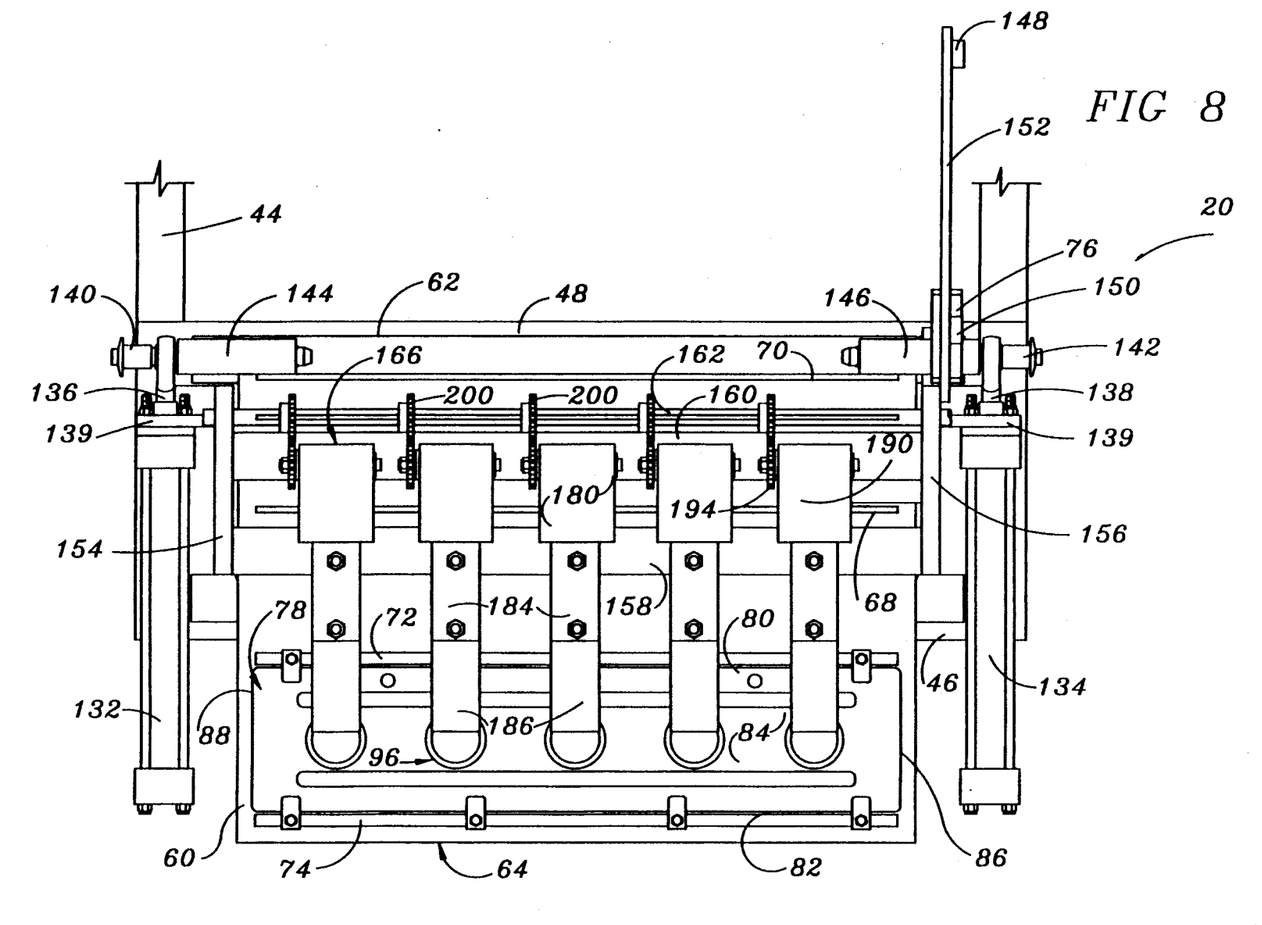
FIG. 8 is a plan view of the preferred patty forming apparatus.
Figure 9:
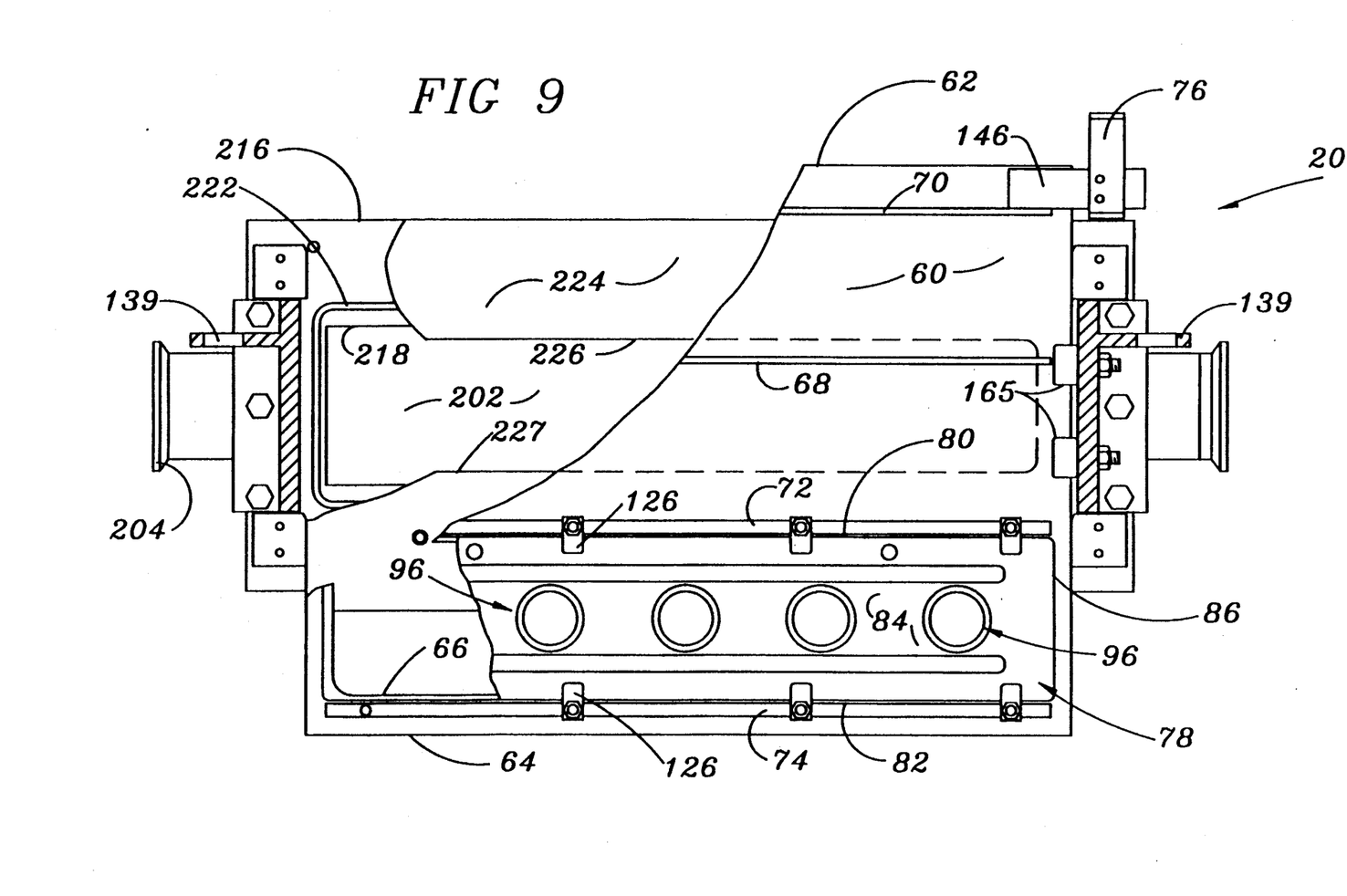
FIG. 9 is a top view of the patty forming apparatus, in partial section and with parts broken away for clarity.

Slide plate assembly 24 includes an elongated, generally flat, planar slide plate 60 presenting a rearward edge 62, forward edge 64 and a large, substantially rectangular aperture 66 therethrough which is proximal to the forward edge 64. The plate has a pair of upstanding, transverse stiffening ribs 68, 70, as well as a pair of upright head connection plates 72, 74 adjacent to and in straddling relationship to aperture 66. An upstanding contact bar 76 is secured to the righthand margin of plate 60 adjacent rearward edge 62 thereof as best seen in FIG. 8.

Figure 10:
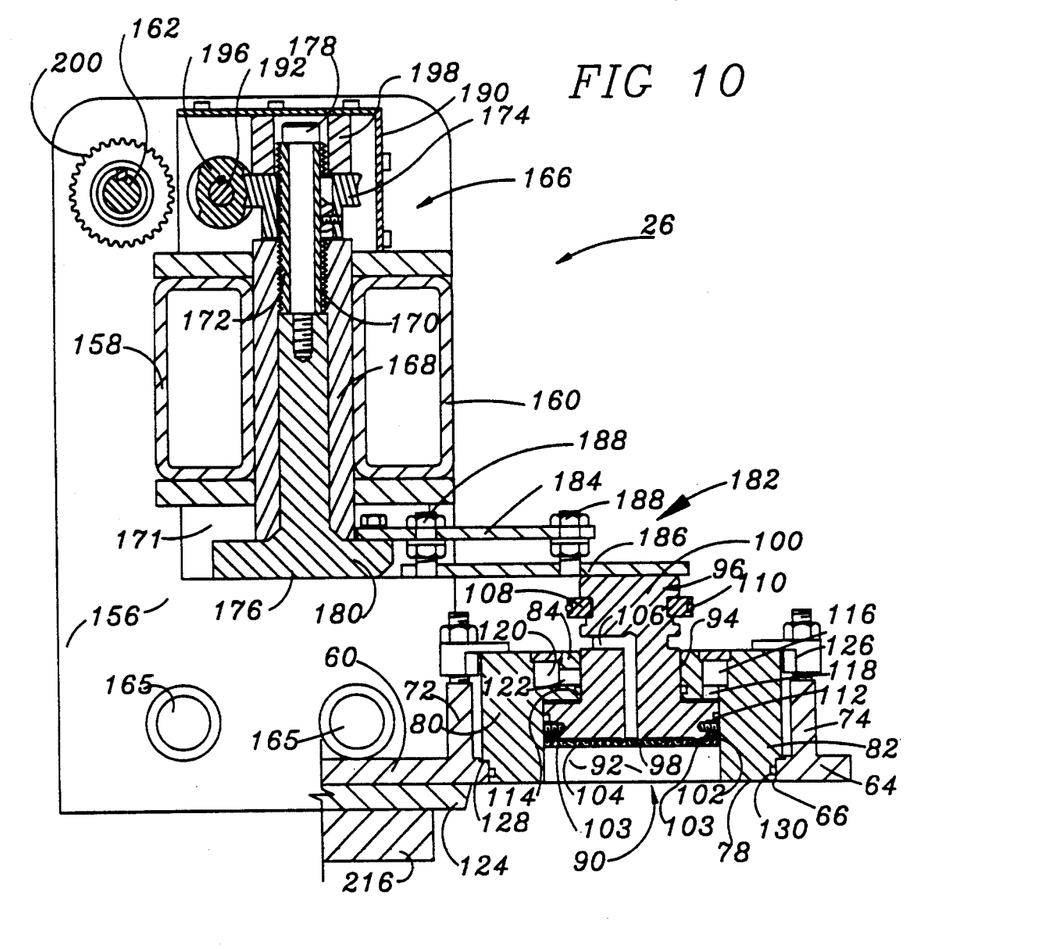
FIG. 10 is an enlarged vertical sectional view illustrating the details of the patty forming head and thickness adjustment mechanism.

The assembly 24 further includes a head assembly broadly referred to by the numeral 78. The head assembly has a rectangular, box-like frame presenting a pair of upright sidewalls 80, 82, top wall 84 and opposed end walls 86, 88. As best seen in FIGS. 8 and 10, the head is configured to present a plurality, here five, of patty forming cavities 90 along the length thereof between end wall 86, 88. Each cavity includes an enlarged lower region 92 together with a radially constricted upper region 94. A shiftable piston 96 is slidably positioned within each cavity 90, and includes a lowermost enlarged section 98 situated within region 92 of the associated cavity, as well as an upstanding section 100 which extends through and above the radially constricted region 94 of the cavity.

Figure 14:
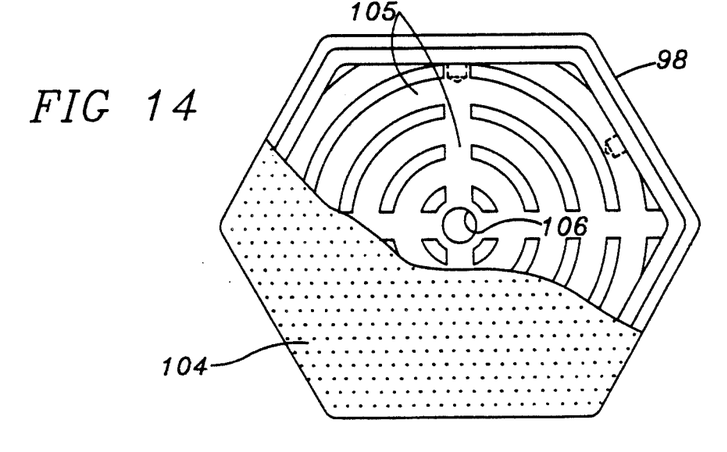
FIG. 14 is a bottom view of the piston depicted in FIG. 13, with parts broken away.

Referring specifically to FIG. 10, it will be seen that each piston 96 is provided with a peripheral ring 102 disposed about the lower periphery of the section 98 and secured thereto by set screws 103; the ring 102 is coupled to and supports a porous, sintered metal or ceramic faceplate 104 which defines the lowermost material-engaging face of the overall piston. Preferably, the faceplate 104 is formed of sintered material having an average pore diameter of from 2 to about 15 microns (most preferably about 5 microns), while the adjacent surface of piston section 98 is provided with a plurality of interconnected, radially and circumferentially extending air passageways 105 (see FIG. 14).

The body of piston 96 is also provided with a pneumatic passageway 106 of inverted, somewhat L-shaped configuration which communicates with the inner surface of faceplate 104 and particularly the passageways 105 provided therein. The section 100 of piston 96 has a two piece, segmented stop ring 108 secured thereto, which is affixed by means of circumscribing O-ring 110. Additional sealing of the piston within the associated cavity is provided by means of O-ring 112 and 114 respectively located within appropriate grooves in section 98 and top wall 84.

In order to effect downward discharge movement of the piston 96, the head assembly includes a transversly extending air passageway or manifold 116 which extends the full length of the head assembly. A short vertical air passageway 118 is also provided for each piston which communicates passageway 116 with the face of the enlarged piston section 98 remote from faceplate 104. Additionally, a second transversely extending passageway or manifold 120 is also provided, with short, radially inwardly extending air passageway 122 for each piston which communicates the passageway 120 and passageway 106 when the piston is in its lowered, patty discharging position. A pneumatic fitting is provided for delivery of pressureized air to the passageway 120, and another such fitting (both not shown) communicates with passageway 116 for delivery of pressurized air thereto.

As illustrated in FIG. 10, the head assembly 78 is affixed to slide plate 60 and is in registry with the plate aperture 66. To this end, a series of threaded connectors 126 are secured to the plates 72, 74 and include projecting tabs which engage the top wall 84 of the head section. The lower margin of each sidewall 80, 82 is notched as at 128 so as to receive and rest atop the adjacent portions of plate 60 a continuous seal 130 between the plate 60 and defining walls of the head assembly completes the connection.

Although the pistons depicted in the drawings are hexagonal in configuration, those skilled in the art will appreciate that virtually any shaped piston can be provided such as circular, square, oval or free form.

Slide plate assembly 24 reciprocates during operation of apparatus 20. For this purpose, a pair of piston and cylinder assemblies 132, 134 are provided, each including a hydraulic cylinder, internal piston 132a, 134a, and projecting piston rod 136, 138. As best seen in FIG. 8, the assemblies 132, 134 are located on opposite sides of plate 60, and are mounted on the sidewalls 154, 156 by means of upstanding mounts 139. The extensible rods 136, 138 are each coupled via quick connect pins 140, 142 to connection brackets 144, 146 respectively secured to slide plate 60. Therefore, extension and retraction of the rods 136, 138 produces corresponding reciprocation of slide plate 60.

The slide plate assembly reciprocates between respective limits defined by limit switches 148, 150 which are supported in spaced relationship on stationary beam 152. As will be appreciated from a study of FIGS. 4-7, the contact bar 76 affixed to slide plate 60 is oriented for engaging the limit switches 148, 150 during travel of the plate.

Adjusting mechanism 26 is situated above slide plate assembly 24 and includes a pair of upright laterally spaced apart sidewalls 154, 156 supported by frame 22. The sidewalls 154, 156 in turn support a pair of transversely extending spaced apart support beams 158, 160, as well as an elongated, axially rotatable keyed shaft 162, the latter being equipped with a large handwheel 164 outboard of and adjacent to sidewall 156. A pair of spaced apart, slide plate engaging rollers 165 are rotatably mounted to the innerface of each sidewall 154, 156, and are located to contact the side marinal edges of slide plate 60 during reciprocation thereof, in order to assist in plate guideance. Finally, it will be seen that stationary beam 152 is fixedly secured to the rearward end of sidewall 156.

Figure 11:
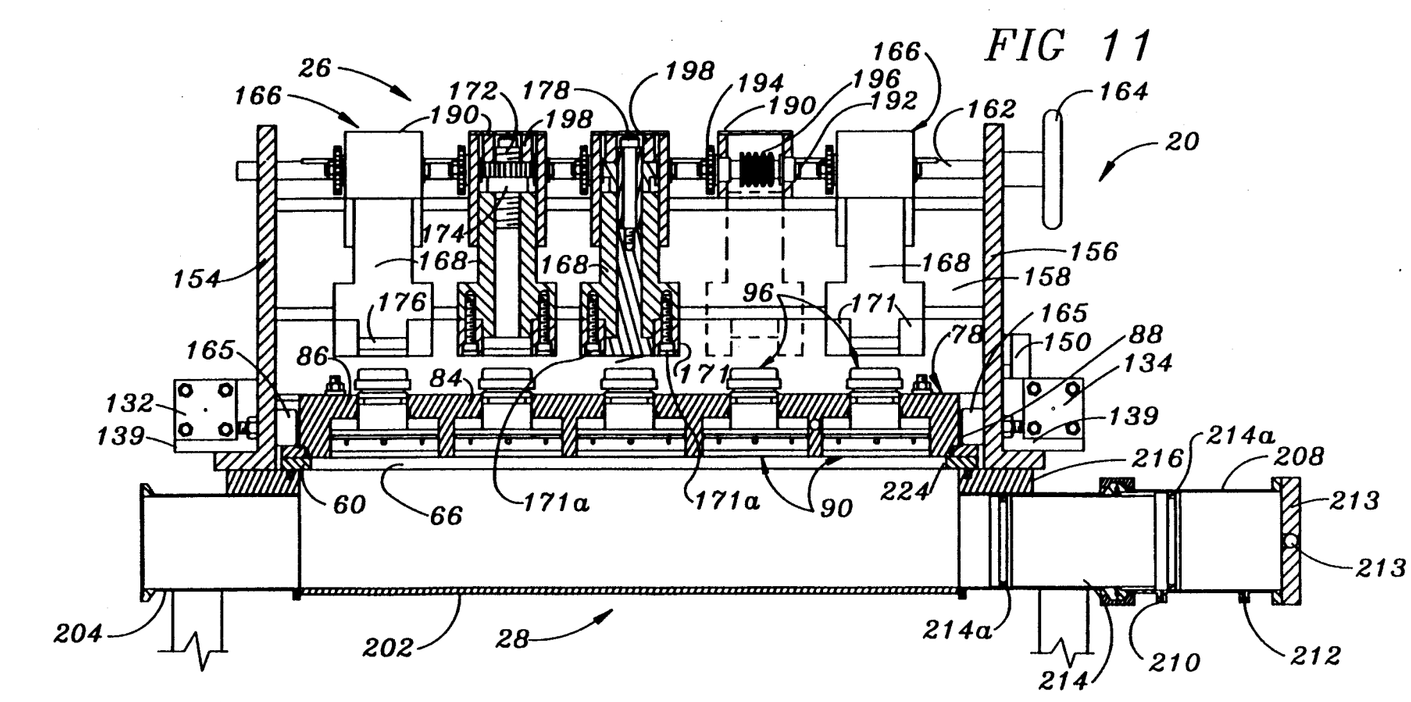
FIG. 11 is a vertical sectional view of the patty forming apparatus, with certain parts removed for clarity, illustrating the head and adjustment mechanism apparatus.

The mechanism 26 further includes a total of five laterally spaced apart adjusting units 166, supported by the beams 158, 160 and spaced between the sidewalls 154, 156 for engaging a corresponding underlying piston 100. Each of the units 166 are identical, and include a stationary upright tubular guide 168 including a threaded upper end 170 and supported by the beams 158, 160; a pair of bottom clamping members 171 secured by bolts 171a are secured to guide 168 (see FIG. 11). The guide in turn receives a tubular, externally threaded drive member 172 provided with an axially extending keyway therein. The portion of member 172 above guide 168 is affixed to a keyed worm gear 174, such that rotation of the worm gear effects up and down movement of the drive member 172 along the length of the threaded upper end of 170 of guide 168. A depending foot member 176 is secured to the lower end of drive member 172 by means of bolt 178 passing through drive member 172; the lower end of the member 176 includes a horizontally extending segment 180. As best seen in FIG. 10, a forwardly extending piston-engaging frame 182 is secured to the segment 180, and includes a pair of vertically spaced apart plates, 184, 186 interconnected by bolts 188. The lowermost plate 186 is designed to engage the upper surface of piston 100 as illustrated. The plates 186 are normally adjusted slightly upwardly (e.g., 20–30 thousanths of an inch) relative to the bottom, piston-engaging surfaces of the adjacent segments 180, for purposes which will be explained.

The upper end of each unit 166 includes a box-like housing 190 which overlies the drive member 172 and its associated structure. A short, transversely extending, rotatable worm shaft 192 extends between the sidewalls of housing 190 and is provided with an external drive gear 194 as well as an internal worm 196. Again referring to FIG. 10, it will be seen that the worm 196 of each unit 166 is in driving engagement with the corresponding worm gear 174. A synthetic resin spacing collar 198 is situated between the upper surface of gear 174 and the top wall of housing 190.

Keyed shaft 162 is provided with a total of five gears 200 spaced along the length thereof and respectively in mesh with a corresponding drive gear 194. Accordingly, rotation of handwheel 164 serves to raise and lower the piston-engaging frame 182 for purposes which will be described.

The material feeding assembly 28 includes a large, arcuate, open top chamber 202 which extends laterally the width of apparatus 20. A tubular coupler 204 is affixed to one end of chamber 202 and is adapted for connection to a food pump 206 through appropriate conduits or the like (not shown). Preferably, a positive pressure, twin piston food pump commercialized by Marlen Research Corporation of Overland Park, Kans. is employed. The opposite end of chamber 202 is secured to a coupler 204 and an accumulator conduit 208 provided with a pair of spaced pneumatic sensing ports 210, 212 and an end plate 213 equipped with a compressed air port 213a. An accumulator piston 214 having terminal, circumscribing seals 214a, is situated within conduit 208 and is shiftable therewithin. A charge of compressed air is maintained between end plate 213 and the adjacent face of piston 214, for purposes to be described.

The chamber 202 is supported by a metallic top plate 216 presenting a relatively large, rectangular aperture 218 therethrough in registry with the open top of the chamber. Top plate 216 is rigidly supported on cross beams 46, 48 as illustrated in FIGS. 4-7. The upper surface of plate 216 is provided with a continuous, circumscribing, seal-receiving groove 220 extending about the aperture 218. A flexible seal 222 is situated within groove 220, and is a known type of seal which is flexible and deflectable upwardly under the influence of fluid pressure exerted by means of conventional apparatus (not shown).

A synthetic resin (e.g., nylon) shearing plate 224 is positioned atop plate 216 and is provided with a rectangular aperture 226 therethrough in general registry with aperture 218 and presenting a beveled, forward edge 227. Aperture 226 is smaller than aperture 218, so as to present an inwardly extending, deflectable lip region 228 about the periphery of aperture 218. Slide plate 60 forming a part of assembly 24 contacts shearing plate 224 and is moveable relative thereto.

Figure 12:
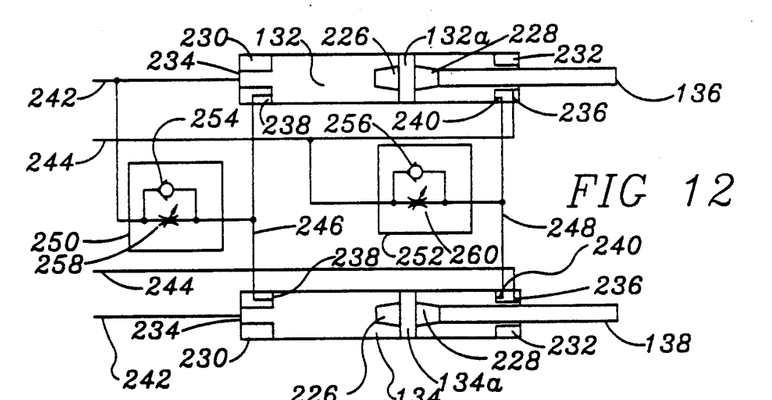
FIG. 12 is a schematic representation of the hydraulic cushioning mechanism associated with the piston and cylinder assemblies employed for reciprocation of the slide plate assembly.
Figure 13:
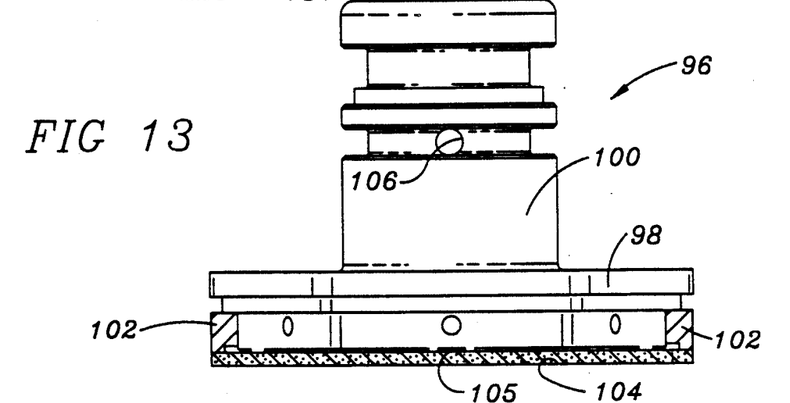
FIG. 13, is an enlarged elevational view of a patty forming piston used in the overall apparatus.

Turning now to FIG. 12, the cushioning apparatus for the mated piston and cylinder assemblies 132, 134 is schematically illustrated. Each of the identical assemblies 132, 134 is of the double-acting variety and includes, as a part of its internal piston, a pair of oppositely extending frustoconical extensions 226, 228. As illustrated, the piston rods 136, 138, are coupled with and extend from the corresponding extensions 228. In addition, the surrounding hydraulic cylinder of each assembly includes endmost tubular bushings 230, 232 designed to coact with the piston extension 226, 228 in the manner to be described. In this regard, it will be seen that piston rod 136 extends through the associated bushing 232 and out of the surrounding hydraulic cylinder.

Each cylinder further includes a pair of primary hydraulic ports 234, 236, together with secondary ports 238, 240 adjacent the respective bushings 230, 232. The primary ports 234, 236 are respectively in communication with the interior regions of the bushings 230, 232, whereas the secondary ports 238, 240 communicate exteriorly of these two regions. Primary hydraulic lines 242, 244 extend from the hydraulic system associated with pump 52 to the ports 234, 236. On the other hand, transverse hydraulic lines 246, 248 interconnect the secondary ports 238, 240 of the mated assemblies 132, 134. A pair of variable resistance flow restricting devices 250, 252 are also provided, each including a one way check valve 254, 256, as well as a restricted orifice 258, 260. Device 250 is couple between primary hydraulic line 242 connected to assembly 132, and to transverse hydraulic line 246 as illustrated; similarly, device 252 is connected between primary hydraulic 244 couple with assembly 132, and transverse hydraulic line 248.

Figure 4:
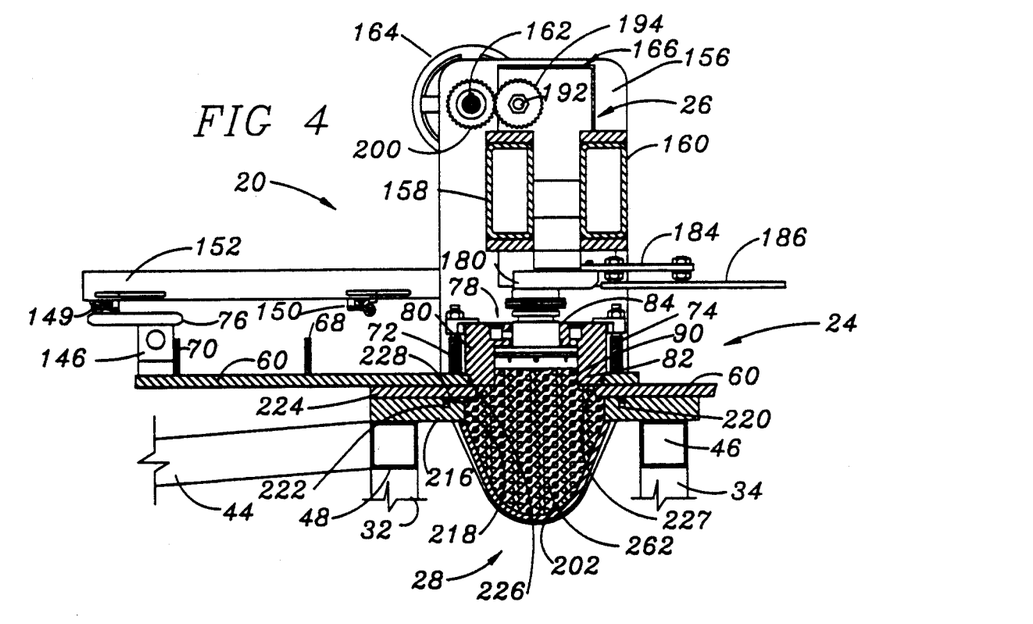
FIG. 4 is a fragmentary view in partial vertical section of the patty forming apparatus shown with the slide plate assembly thereof in its material-receiving position.
Figure 5:
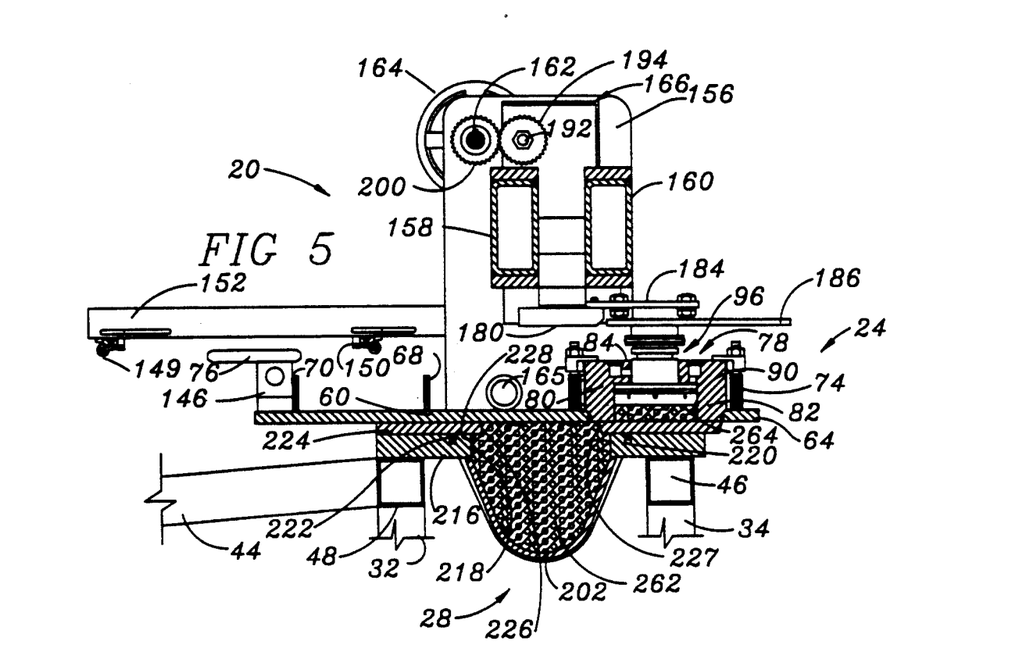
FIG. 5 is a view similar to that of FIG. 4, but illustrating the slide plate assembly shifted rightwardly from the material-receiving position.
Figure 6:
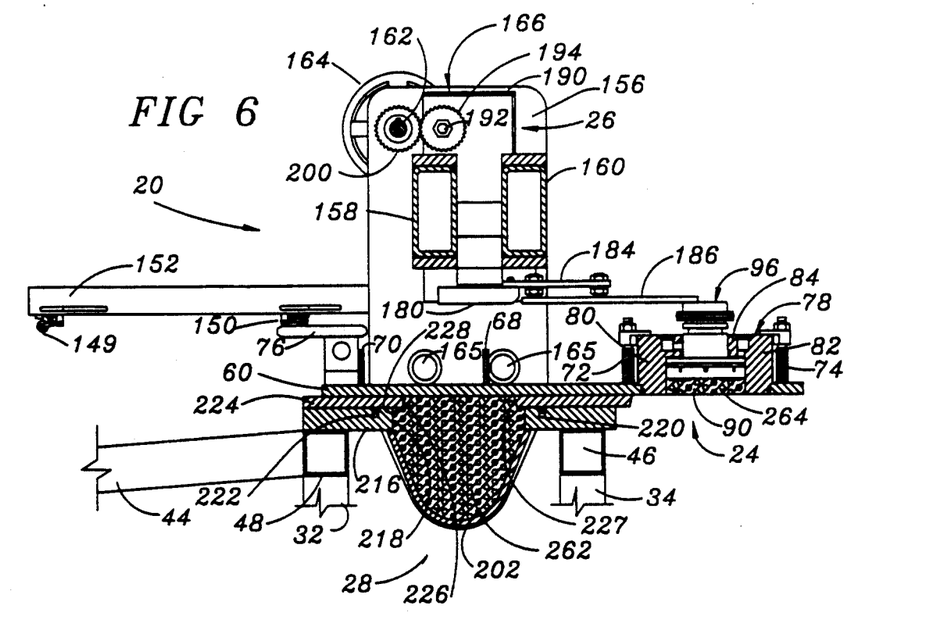
FIG. 6 is a view similar to that of FIGS. 4-5, but depicting the slide plate assembly in its patty-discharging position.

Attention is next directed to FIGS. 4-6 which depict the operation of apparatus 20. FIG. 4 illustrates the slide plate assembly 24 in its retracted position wherein the cavities 90 are in registry with aligned apertures 218, 226, and thereby in communication with chamber 202. The latter is filled with meat 262 under positive pressure, such being provided by virtue of operation of meat pump 206. As a consequence, the meat 262 is fed upwardly into the cavities 90 so that the pistons are elevated until the upper ends thereof engage the overlying segments 180. At this point, the cavities 90 are filled to capacity. Displacement of air from the cavities 90 is accomplished by passage of such air upwardly through the porous faceplates 104, and passageways 105, 106 to the atmosphere. In this fashion, the undesirable buildup of air within the cavities 90 is completely illiminated.

Slide plate 60 is next moved rightwardly as viewed in FIG. 5 so as to move head assembly 78 out of communication with chamber 202 to complete the formation of meat patties 264 within the respective cavities. As illustrated in FIG. 5, the bottom surfaces of the patties 264 slide along synthetic resin shearing plate 224; clean patty formation is assured by virtue of beveled edge 227 forming a part of the aperture 226. Note also that piston height is maintained by means of engagement between pistons 96 and the overlying plates 186. As explained previously, the plates 186 are positioned slightly above the adjacent surfaces of the segments 180 so that, as the pistons move out of engagement with the segments 180 and into engagement with the plates 186, the internal pressure of the meat within the cavities 90 is relieved. This prevents unwanted, premature ejection or "squirting" of meat from the cavities 90 as the cavities clear the forward edge of plate 224 during movement of slide plate 60 to the patty discharge position depicted in FIG. 6.

Figure 7:
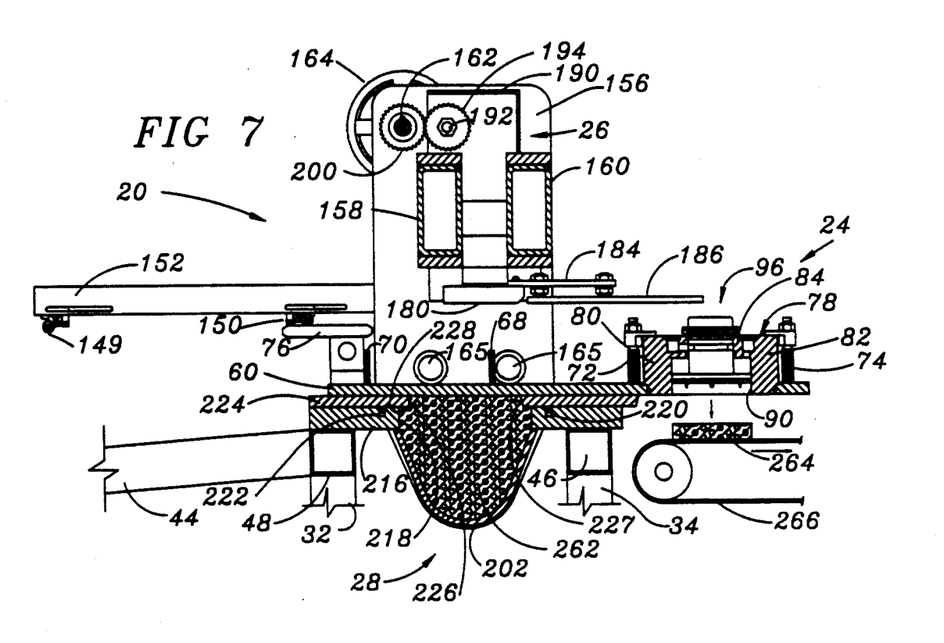
FIG. 7 is a view similar to that of FIG. 6, and illustrating the patty discharging operation of the slide plate assembly.

FIG. 6 depicts the orientation of apparatus 20 with slide plate assembly 24 in its forward most position where assembly 78 has completely cleared shearing plate 224. At this point, the pistons 96 of head assembly 78 are pneumatically actuated so as to eject the formed patties 264 from the respective cavities 90. Referring to FIG. 10, it will be seen that application of compressed air through manifold 116 and in timed relationship with the movement of head 78, effects downward shifting movement of the pistons 96. Specifically, compressed air delivered through the manifold 116 is directed through passageways 118 so that such air encounters the upper annular faces of piston sections 98, to forcibly drive the pistons downwardly. At the downward end of the piston stroke where the piston stop rings 108 engage top wall 84, the pneumatic passageways 106 forming a part of the pistons 96 comes into operative communication with the associated, horizontally extending passageways 122 connected with manifold 120. Compressed air is delivered to the latter in properly timed relationship so as to deliver such air through the passageways 122, 106 and ultimately to the surfaces of faceplates 104 remote from patties 264. Such air is then directed via passageways 105 to all portions of the porous faceplates, so that pressurized air is delivered to the faceplates 104 in order to quickly and cleanly eject the formed patties 264. As best seen in FIG. 7, a conventional belt conveyor 266 or other expedient is situated below the slide plate assembly 24 so as to catch the ejected patties and convey them for further processing.

After patty ejection, the assembly 24 is in position for retraction back to the FIG. 4 orientation, so as to repeat the patty forming cycle. Preferably, the pistons 96 are positioned with the bottom faceplates thereof slightly above the lower defining margins of the associated cavities 90. Any entrapped air below the faceplates as the slide plate 60 retracts is vented to the atmosphere through the porous faceplates and the passageways 105, 106. This venting capability also permits use of transversely arcuate or otherwise irregularly shaped cavities within head assembly 78, to thereby allow formation of correspondingly shaped patties. Heretofore, it has been difficult to form such patties because of the tendency of prior patty forming machines to entrap air within the cavities prior to filling thereof.

During the described patty forming operations of apparatus 20, the accumulator conduit 208 and slidable accumulator 214 come into play. In this regard, it is preferred to employ a food pump 206 (such as the Marlen pump previously described) equipped with pneumatic operational controls. Appropriate pneumatic lines (not shown) are connected between the conventional pump controls and the ports 210, 212 forming a part of accumulator conduit 208. Such a pump/accumulator arrangement is specifically disclosed and explained in U.S. Pat. No. 4,780,931, which is incorporated by reference herein. In any event, excess meat fed to chamber 202 is collected within conduit 208, which has the effect of shifting piston 214 rightwardly as viewed in FIG. 11 against the bias exerted by the charge of compressed air between piston 214 and end plate 213. Such accumulation of meat continues until piston 214 is moved to a position covering port 212. This piston movement is sensed and an appropriate pneumatic signal is sent to pump 206 in order to slow down or stop the pump as required. Continued action of the apparatus 20, serving to deplete the supply of meat within chamber 202, allows meat accumulated within conduit 208 to be fed back to chamber 202, such action being accomplished by virtue of the bias against piston 214 from the charge of compressed air within the conduit. Of course, if piston 214 moves leftwardly to the point where port 210 is open, a pneumatic signal is sent to pump 206 in order to increase its output.

If it is desired to alter the thickness of the patties 264 being formed, the operator has two options. If a thickness change in all patties is desired, it is only necessary to grasp handwheel 164 and rotate shaft 162 in the desired direction. Such rotation serves, via gears 200, 194, shafts 192, worms 196 and worm gears 174, to appropriately raise or lower the foot members 176 and connected plates 184, 186. As best illustrated in FIG. 10, such rotation of shaft 162 effects vertical movement of the drive members 172 so as to produce the desired adjustment of the foot members and plates.

On the other hand, if it is desired to adjust only certain of the pistons 96 insofar as their stroke lengths are concerned, each adjusting unit 166 can be individually manipulated. Specifically, individual adjustment may be accomplished by shifting the gear 200 associated with the unit to be adjusted along shaft 162 until the gear 200 is moved out of mesh with the cooperating gear 194. At this point, the gear 194 may be rotated to again raise or lower the respective foot member 176 and plates 184, 186. After such adjustment is completed, the gear 200 is again moved along shaft 162 until proper meshing relationship is established with the gear 194.

During the operation of piston and cylinder assemblies 132, 134, the cushioning apparatus depicted in FIG. 12 serves to equalize and cushion the travel of pistons 132a, 134a as the pistons approach the ends of their strokes. Specifically, and referring to FIG. 12, a situation is depicted wherein the pistons 132a, 134a are moving rightwardly. During such movement, pressurized hydraulic fluid is directed through lines 242 and ports 234 while simultaneously fluid is being exhausted through ports 236 and lines 244. As the extension 228 approach bushings 232, however, flow of fluid through the ports 236 is progressively restricted. At this point, hydraulic fluid begins to exhaust through secondary ports 240 and line 248. Such flow is restricted by means of orifice 260 forming a part of device 252, so that the travel of the pistons 132a, 134a is slowed and cushioned until the terminal ends of the travel of the pistons is reached. This situation is reversed when the pistons travel leftwardly as viewed in FIG. 12, wherein cushioning is effected by exhaust flow of fluid through ports 238, line 246, and orifice 258. It will therefore be appreciated that the assemblies 132, 134 operate completely in unison with appropriate cushioning at the ends of each piston stroke. This ensures that the slide plate assembly 24 is not subjected to torsional forces during reciprocation, and eliminates possibly destructive shock loads at the ends of slide plate travel.

We claim:

1. Patty forming apparatus comprising:
   a patty forming plate assembly including structure defining a patty forming cavity, and a slidable piston presenting a patty material-engaging face formed of porous material and movable within said cavity between a retracted position allowing flow of patty forming material into said cavity for forming of a patty therein, and an extended discharge position for discharge of the formed patty;
   means supporting said plate assembly for reciprocating, translational, fore and aft shifting movement thereof between a material-receiving position and a patty-discharging position;
   means operably coupled with said plate assembly for delivery of patty forming material to the assembly when the assembly is in the material-receiving position thereof, in order to fill said cavity and form said patty therein;
   means for shifting said piston to the discharge position thereof when said assembly is in said patty-discharging position; and
   means for forcibly separating said patty from said piston face when the piston is in said patty-discharging position thereof,
   said patty-separating means including means for applying a burst of pressurized fluid through said piston face to separate said patty therefrom.

2. The apparatus as set forth in claim 1, including means for limiting the movement of said piston within said cavity when said plate assembly is in the material-receiving position thereof, said movement-limiting means including structure for selectively altering the stroke length of said piston in said cavity in order to vary the thickness of the patty formed in said cavity.

3. The apparatus as set forth in claim 2, said movement-limiting means being disposed above said piston and oriented for engagement by the piston when the assembly is in the material-receiving position thereof, there being structure for selective up and down adjustment of said movement-limiting means.

4. The apparatus as set forth in claim 1, said material-delivery means including a material-holding chamber beneath said plate assembly, means for operably coupling said chamber to a source of material under pressure, and accumulator apparatus in communication with said chamber.

5. The apparatus as set forth in claim 4, said cavity being located between said chamber-coupling means and said accumulator apparatus, said accumulator apparatus including an elongated conduit, with accumulator piston means slidably received within said conduit.

6. The apparatus as set forth in claim 1, said plate-supporting means comprising hydraulic piston and cylinder drive means operably coupled to said plate assembly.

7. The apparatus as set forth in claim 1, said piston shifting means comprising structure for selective application of fluid pressure against said piston for shifting of the latter to the piston discharge position.

8. The apparatus as set forth in claim 1, said patty material-engaging face of said piston being formed of sintered metal or porous synthetic resin or ceramic material.

9. The apparatus as set forth in claim 8, said patty material-engaging face being formed of sintered metal having an average pore size of from about 2 to 15 microns in diameter.

10. The apparatus as set forth in claim 1, including structure operably coupled with said delivery means for delivery of said material to said assembly under positive pressure.

11. The apparatus as set forth in claim 1, there being structure for communicating said porous patty material-engaging face with the atmosphere.

12. Patty forming apparatus comprising:
an apertured, generally flat forming plate;
a patty forming head secured to said plate and in registry with the aperture therethrough, said head including structure defining a plurality of spaced, individual cavities, and a like plurality of slidable pistons respectively moveable within each of said cavities between retracted positions allowing flow patty forming material into corresponding cavities for formation of patties therein, and extended discharge positions for discharge of formed patties from said cavities;
means supporting said plate for translational shifting movement of the plate and head between a material-receiving position and a spaced patty-discharge position;
means operably coupled with said plate and in communication with said aperture for delivery of material to said cavities when said plate is in said material-receiving position thereof, in order to fill said cavities and form said patties therein;
means for shifting said pistons to the discharge positions thereof when said plate is in the patty-discharging position thereof; and
means for limiting the movement of said pistons within corresponding cavities when said plate is in said material-receiving position thereof in order to vary the thickness of patties formed in said cavities,
said movement limiting means including a separate piston-engaging unit disposed above each corresponding piston,
there being adjustment structure operably coupled with said units for simultaneously adjusting each of said separate piston-engaging units for up and down adjusting movement in unison, said adjustment structure also being operable for alternate adjustment of each of said separate piston-engaging units for independent up and down adjusting movement thereof with respect to the other units.

13. In a patty forming apparatus including a shiftable patty forming plate assembly having a plurality of patty forming cavities therein, a shiftable piston situated within each cavity, means operably coupled with said plate assembly for delivery of patty forming material to said cavities for formation of patties therein, and means for subsequently shifting said pistons for ejecting formed patties from said cavities, the improvement which comprises patty thickness adjusting means operably coupled with said pistons for varying the thickness of patties formed in said cavities, said adjusting means including structure for simultaneously adjusting each of said pistons within each of said cavities in unison for uniformly varying the thickness of the patties formed in each of said cavities, and structure for individually adjusting each of said pistons relatively to the other pistons for varying the thickness of patties in each of said cavities independently.

14. Patty forming apparatus as set forth in claim 13, said thickness adjusting means a separate piston-engaging unit disposed above each corresponding piston and oriented for engagement by the corresponding piston during delivery of patty forming material to said cavities, there being structure operably coupled with all of said units for selective up and down adjusting movement thereof in unison, and for individual up and down adjusting movement of each of said units with respect to the other units.

15. In a patty forming apparatus including a shiftable patty forming plate assembly having structure defining a patty forming cavity therein, means for delivery of patty forming material to said cavity for formation of a patty therein, and means for subsequently ejecting said formed patty from said cavity, the improved material-delivery means which comprises:
a material-conveying chamber oriented for receiving patty forming material from said cavity and presenting an apertured plate;
a deflectable, synthetic resin apertured shearing plate located intermediate said plate and said patty forming plate assembly,
the apertures of said plate and said shearing plate being in general alignment, with said shearing plate aperture being smaller than said plate aperture to present an inwardly extending lip region which is a part of said shearing plate and which extends about the periphery of said plate aperture,
said patty forming plate assembly being shiftable relative to said plate and shearing plate and being proximal to the latter; and
means for coupling said chamber to a pumping device for delivery of patty forming material under positive pressure to said chamber, in order to cause said material under positive pressure to engage said lip region and deflect said shearing plate into sealing engagement with said shiftable patty forming assembly.

16. The patty forming apparatus of claim 15, including structure defining a seal-receiving groove in the face of said plate adjacent said shearing plate, said groove circumscribing said top plate aperture, and a resilient, fluid pressure acuatable sealing member within said groove and adapted to sealingly engage said shearing plate.

17. The patty forming apparatus of claim 15, said patty forming plate assembly including a generally flat, apertured forming plate, and means for selective, translational, fore and aft shifting movement of the plate relative to said plate and said shearing plate.

18. In patty forming apparatus comprising a shiftable patty forming plate assembly having structure defining a patty forming cavity therein, means operably coupled with said assembly for delivery of patty forming material to said cavity for formation of a patty therein, and means for subsequently ejecting a formed patty from said cavity, improved structure for shifting movement of said patty forming plate assembly which comprises:

a pair of mated hydraulic piston and cylinder assemblies each coupled to said assembly and each including a hydraulic cylinder, a piston slidably received within said cylinder, and a piston rod coupled to said piston and extending outwardly from said cylinder, said pistons being shiftable within said cylinders between spaced terminii which define the stroke length of said pistons and piston rods; and control means operably coupled to both of said piston and cylinder assemblies for equalizing and cushioning the travel of said pistons as each of the pistons approach a corresponding terminii.

* * * * *